(12) United States Patent
Tseng

(10) Patent No.: US 11,982,876 B2
(45) Date of Patent: May 14, 2024

(54) OPTICAL IMAGING LENS

(71) Applicant: Calin Technology Co., Ltd., Taichung (TW)

(72) Inventor: Yung-Chieh Tseng, Taichung (TW)

(73) Assignee: CALIN TECHNOLOGY CO., LTD., Taichung (TW)

(*) Notice: Subject to any disclaimer, the term of this patent is extended or adjusted under 35 U.S.C. 154(b) by 498 days.

(21) Appl. No.: 17/406,873

(22) Filed: Aug. 19, 2021

(65) Prior Publication Data

US 2022/0404581 A1 Dec. 22, 2022

(30) Foreign Application Priority Data

Jun. 22, 2021 (TW) ................................. 110122721

(51) Int. Cl.
  *G02B 9/62* (2006.01)
  *G02B 9/64* (2006.01)
  *G02B 13/00* (2006.01)
  *G02B 5/20* (2006.01)

(52) U.S. Cl.
  CPC ........... *G02B 9/64* (2013.01); *G02B 13/0045* (2013.01); *G02B 5/208* (2013.01)

(58) Field of Classification Search
  CPC ........ G02B 9/62; G02B 9/64; G02B 13/0045; G02B 13/06; G02B 13/18; G02B 5/208
  USPC .................................................. 359/691, 713
  See application file for complete search history.

(56) References Cited

U.S. PATENT DOCUMENTS

| 11,307,383 B2* | 4/2022 | Lin ........................ G02B 13/146 |
| 2006/0087747 A1* | 4/2006 | Ohzawa ................. G02B 13/18 359/749 |
| 2008/0074761 A1* | 3/2008 | Yamakawa ............ G02B 13/04 359/794 |
| 2009/0034101 A1* | 2/2009 | Hsu ........................ G02B 13/06 359/793 |
| 2009/0251801 A1* | 10/2009 | Jung ...................... G02B 13/04 359/708 |

(Continued)

FOREIGN PATENT DOCUMENTS

| TW | 201543070 A | 11/2015 |
| TW | 202022424 A | 6/2020 |

OTHER PUBLICATIONS

Taiwanese Search Report for Taiwanese Application No. 110122721, dated Aug. 12, 2021, with English translation.

*Primary Examiner* — William R Alexander
(74) *Attorney, Agent, or Firm* — Birch, Stewart, Kolasch & Birch, LLP

(57) ABSTRACT

An optical imaging lens, in order from an object side to an image side along an optical axis, includes a first lens assembly, an aperture, and a second lens assembly. The first lens assembly has negative refractive power and includes a first lens, a second lens, and a third lens. The first lens has negative refractive power. The second lens has negative refractive power. The third lens has positive refractive power. The second lens assembly has positive refractive power and includes a fourth lens, a fifth lens, and a sixth lens. The fourth lens has positive refractive power. The fifth lens has negative refractive power. The sixth lens has positive refractive power. In this way, the optical imaging lens of the present invention not only could achieve the effect of high image quality and low distortion, but also could reduce the volume of the optical imaging lens.

21 Claims, 8 Drawing Sheets

(56) References Cited

U.S. PATENT DOCUMENTS

| | | | |
|---|---|---|---|
| 2010/0142062 A1* | 6/2010 | Asami | G02B 13/04 |
| | | | 359/793 |
| 2012/0026285 A1* | 2/2012 | Yoshida | G02B 13/06 |
| | | | 359/717 |
| 2014/0198395 A1* | 7/2014 | Ryu | G02B 13/0045 |
| | | | 359/713 |
| 2015/0062720 A1* | 3/2015 | Lai | G02B 3/02 |
| | | | 359/713 |
| 2017/0168271 A1* | 6/2017 | Jiang | G02B 13/04 |
| 2018/0045925 A1* | 2/2018 | Chuang | G02B 13/06 |
| 2018/0120544 A1* | 5/2018 | Chiang | G02B 3/02 |
| 2018/0356613 A1* | 12/2018 | Chen | G02B 7/04 |
| 2019/0094498 A1* | 3/2019 | Liao | G02B 13/02 |
| 2019/0121062 A1* | 4/2019 | Ohashi | G02B 27/0037 |
| 2019/0384042 A1* | 12/2019 | Lin | G02B 13/18 |
| 2020/0192062 A1* | 6/2020 | Lin | G02B 13/146 |
| 2020/0254941 A1* | 8/2020 | Bao | G02B 13/0045 |
| 2020/0278517 A1* | 9/2020 | Liao | G02B 13/0045 |
| 2020/0400923 A1* | 12/2020 | Song | G02B 9/62 |
| 2021/0003822 A1* | 1/2021 | Chang | G02B 13/003 |
| 2021/0215916 A1* | 7/2021 | Lin | G02B 13/0045 |
| 2021/0333509 A1* | 10/2021 | Chiu | G02B 9/62 |

* cited by examiner

OPTICAL IMAGING LENS

BACKGROUND OF THE INVENTION

Technical Field

The present invention generally relates to an optical image capturing system, and more particularly to an optical imaging lens.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, as the image quality of the automotive lens changes with the temperature of an external application environment, the temperature requirements of the automotive lens also increase. Therefore, the requirement for high imaging quality is rapidly raised.

However, conventional optical imaging lenses can no longer meet the existing needs. Therefore, how to provide an optical imaging lens that could effectively reduce aberrations and improve the quality of optical imaging has become a major issue in the industry.

BRIEF SUMMARY OF THE INVENTION

In view of the reasons mentioned above, the primary objective of the present invention is to provide an optical imaging lens that provides a better optical performance of high image quality and low distortion.

The present invention provides an optical imaging lens, in order from an object side to an image side along an optical axis, including a first lens assembly having negative refractive power, an aperture, and a second lens assembly having positive refractive power, wherein the first lens assembly includes a first lens, a second lens, and a third lens in order from the object side to the image side along the optical axis. At least two of the first lens, the second lens, and the third lens are in contact with each other. The first lens has negative refractive power. An object-side surface of the first lens is a convex surface, and an image-side surface of the first lens is a concave surface. The object-side surface of the first lens and/or the image-side surface of the first lens are/is a spherical surface. The second lens has negative refractive power. An object-side surface of the second lens is a convex surface, and an image-side surface of the second lens is a concave surface. The object-side surface of the second lens and/or the image-side surface of the second lens are/is an aspheric surface. The third lens has positive refractive power. An object-side surface of the third lens is a concave surface, and an image-side surface of the third lens is a convex surface. The object-side surface of the third lens and/or the image-side surface of the third lens are/is an aspheric surface. The second lens assembly includes a fourth lens, a fifth lens, and a sixth lens in order from the object side to the image side along the optical axis. The fourth lens is a biconvex lens with positive refractive power. An object-side surface of the fourth lens and/or an image-side surface of the fourth lens are/is a spherical surface. The fifth lens is a biconcave lens with negative refractive power. An object-side surface of the fifth lens and/or an image-side surface of the fifth lens are/is an aspheric surface. The sixth lens is a biconvex lens with positive refractive power. An object-side surface of the sixth lens and/or an image-side surface of the sixth lens are/is an aspheric surface.

With the aforementioned design, the optical imaging lens of the present invention could achieve the effect of high image quality and low distortion. Additionally, lenses in the optical imaging lens are limited to six, which reduces the volume and helps to keep the optical imaging lens miniaturized and lightweight, and the optical imaging lens of the present invention could be easily manufactured and assembled.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
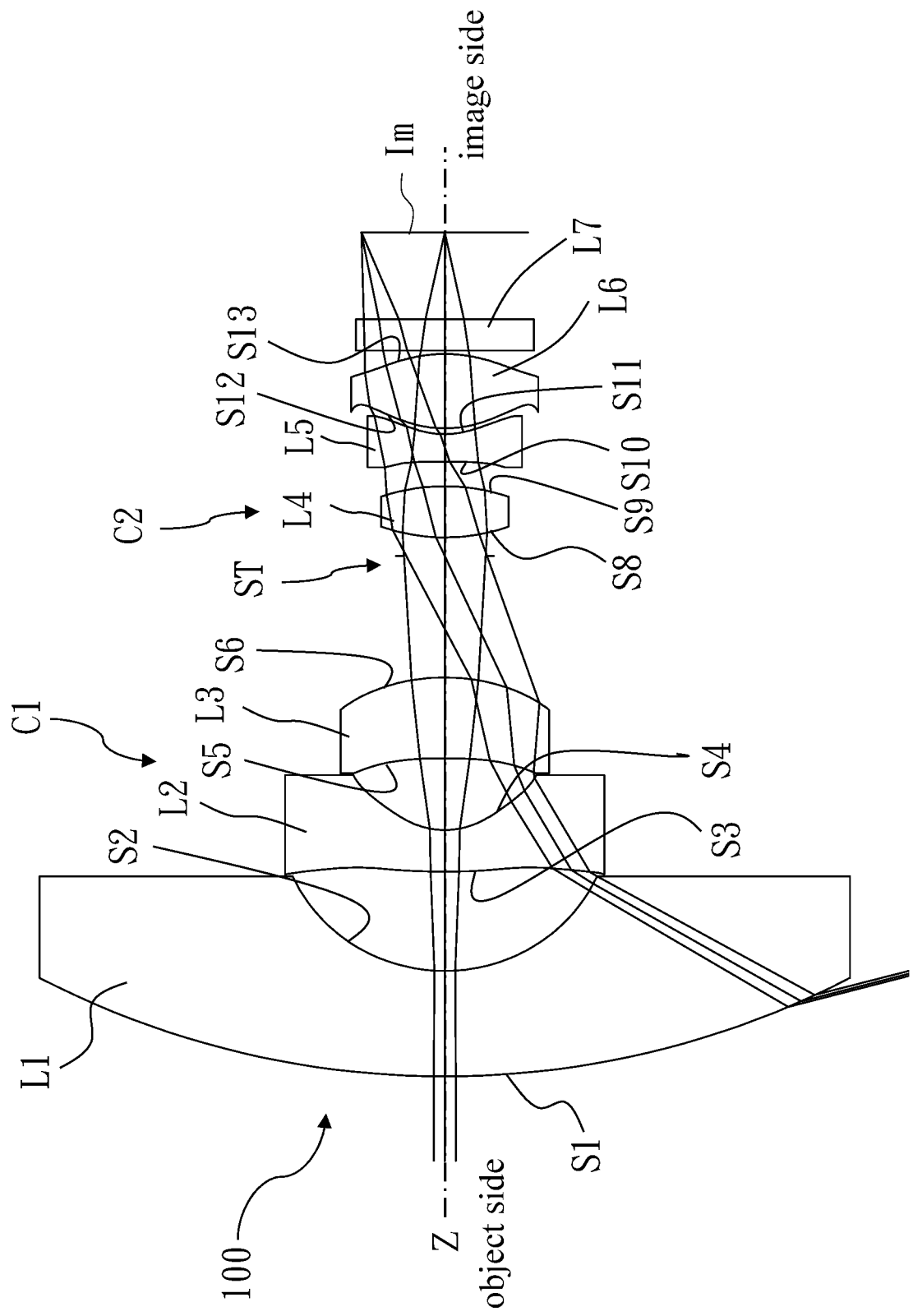
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first lens assembly C1, an aperture ST, and a second lens assembly C2, wherein the aperture ST is adapted to reduce the stray light going into the optical imaging lens 100, and therefore enhances the image quality.

The first lens assembly C1 has negative refractive power, wherein the first lens assembly includes a first lens L1, a second lens L2, and a third lens L3 in order along the optical axis Z from the object side to the image side. In the current embodiment, at least two of the first lens L1, the second lens L2, and the third lens L3 contact with each other. In an embodiment, the first lens L1 is in contact with the second lens L2, and the second lens L2 is in contact with the third lens L3. With such design, a distance between the aforementioned lenses L1-L3 could be fixed by simply the physical structure of the lens without affecting the optical parameters of the first lens L1, the second lens L2, and the third lens L3 and the combined optical parameters, thereby enhancing the effect of optical stability.

The first lens L is a negative meniscus with negative refractive power, wherein an object-side surface S1 of the first lens L1 is a convex surface, and an image-side surface S2 of the first lens L1 is a concave surface that is arc-shaped. In the current embodiment, a part of a surface of the first lens L1 toward the image side is recessed to form the image-side surface S2, and the optical axis Z passes through both the object-side surface S1 and the image-side surface S2. The object-side surface S1 of the first lens L1, the image-side surface S2 of the first lens L1, or both of the object-side surface S1 and the image-side surface S2 of the first lens L1 are spherical surfaces. In the current embodiment, both of the object-side surface S1 and the image-side surface S2 of the first lens L1 are spherical surfaces.

The second lens L2 is a negative meniscus with negative refractive power, wherein an object-side surface S3 of the second lens L2 is a convex surface that is slightly convex toward the object side and has two inflection points, and an image-side surface S4 of the second lens L2 is a concave surface that is arc-shaped. The object-side surface S3 of the second lens L2 is in contact with the image-side surface S2 of the first lens L1 to fix a distance between the first lens L1 and the second lens L2. In the current embodiment, a part of a surface of the second lens L2 toward the image side is recessed to form the image-side surface S4, and the optical axis Z passes through both the object-side surface S3 and the image-side surface S4. The object-side surface S3 of the second lens L2, the image-side surface S4 of the second lens L2, or both of the object-side surface S3 and the image-side surface S4 of the second lens L2 are aspheric surfaces. In the current embodiment, both of the object-side surface S3 and the image-side surface S4 of the second lens L2 are aspheric surfaces.

The third lens L3 is a positive meniscus with positive refractive power, wherein an object-side surface S5 of the third lens L3 is a concave surface, and an image-side surface S6 of the third lens L3 is a convex surface. The object-side surface S5 of the third lens L3 is in contact with the image-side surface S4 of the second lens L2 to fix a distance between the second lens L2 and the third lens L3. The object-side surface S5 of the third lens L3, the image-side surface S6 of the third lens L3, or both of the object-side surface S5 and the image-side surface S6 of the third lens L3 are aspheric surfaces. In the current embodiment, both of the object-side surface S5 and the image-side surface S6 of the third lens L3 are aspheric surfaces.

The second lens assembly C2 has positive refractive power and includes a fourth lens L4, a fifth lens L5, and a sixth lens L6 in order along the optical axis Z from the object side to the image side.

The fourth lens L4 is a biconvex lens with positive refractive power (i.e., an object-side surface S8 of the fourth lens L4 and an image-side surface S9 thereof are convex surfaces), wherein the object-side surface S8 of the fourth lens L4, the image-side surface S9 of the fourth lens L4, or both of the object-side surface S8 and the image-side surface S9 of the fourth lens L4 are spherical surfaces. In the current embodiment, both of the object-side surface S8 and the image-side surface S9 of the fourth lens L4 are spherical surfaces.

The fifth lens L5 is a biconcave lens with negative refractive power (i.e., an object-side surface S10 of the fifth lens L5 and an image-side surface S11 thereof are concave surfaces), wherein the object-side surface S10 of the fifth lens L5, the image-side surface S11 of the fifth lens L5, or both of the object-side surface S10 and the image-side surface S11 of the fifth lens L5 are aspheric surfaces. In the current embodiment, both of the object-side surface S10 and the image-side surface S11 of the fifth lens L5 are aspheric surfaces.

The sixth lens L6 is a biconvex lens with positive refractive power (i.e., an object-side surface S12 of the sixth lens L6 and an image-side surface S13 thereof are convex surfaces), wherein the object-side surface S12 of the sixth lens L6 has two inflection points. The object-side surface S12 of the sixth lens L6, the image-side surface S13 of the sixth lens L6, or both of the object-side surface S12 and the image-side surface S13 of the sixth lens L6 are aspheric surfaces. In the current embodiment, both of the object-side surface S12 and the image-side surface S13 of the sixth lens L6 are aspheric surfaces.

Additionally, the optical imaging lens 100 further includes an infrared filter L7 disposed at a side of the image-side surface S13 of the sixth lens L6 and located between the sixth lens L6 and an image plane Im of the optical imaging lens 100.

In order to keep the optical imaging lens 100 in good optical performance and high imaging quality, the optical imaging lens 100 further satisfies:

(1) $0.05 < F/TTL < 0.075$;

(2) $-0.29 < F/f123 < -0.25$; $-0.45 < F/f1 < -0.1$; $-0.4 < F/f2 < -0.1$; $0.05 < F/f3 < 0.15$;

(3) $0.45 < f1/f2 < 2.5$; $-0.7 < f2/f3 < -0.25$;

(4) $0.27 < F/f456 < 0.35$; $0.25 < F/f4 < 0.35$; $-0.4 < F/f5 < -0.3$; $0.45 < F/f6 < 0.35$;

(5) $-1.5 < f6/f5 < -0.8$; $-1.5 < f4/f5 < -0.8$;

(6) $-0.9 < f456/f123 < -0.8$;

wherein TTL is a total length of the optical imaging lens 100 (i.e., a distance on the optical axis Z from the object-side surface of the first lens to the image plane); F is a focal length of the optical imaging lens 100; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f123 is a focal length of the first lens assembly C1; f456 is a focal length of the second lens assembly C2.

Parameters of the optical imaging lens 100 of the first embodiment of the present invention are listed in following Table 1, including the focal length F of the optical imaging lens 100 (also called an effective focal length (EFL)), a F-number (Fno), a maximal field of view (HFOV), a total length of the optical imaging lens 100 (TTL) (i.e., a distance on the optical axis Z from the object-side surface of the first lens to the image plane), a radius of curvature (R) of each lens, a distance (D) between each surface and the next surface on the optical axis Z, a refractive index (Nd) of each lens, an Abbe number (Vd) of each lens, and the focal length of each lens, and the focal length of the first lens assembly C1 and the focal length of the second lens assembly C2, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 1

F = 1.46 mm; Fno = 2.4; HFOV = 210 deg; TTL = 24.3 mm; 1/2 Image height = 2.3mm

| Surface | R (mm) | D (mm) | Nd | Vd | Focal length | Note |
|---|---|---|---|---|---|---|
| S1 | 23.470 | 3.04 | 1.73 | 54.6 | −4.468 | L1 |
| S2 | 4.600 | 2.86 | | | | |
| S3 | 31.935 | 1.20 | 1.53 | 56 | −8.39 | L2 |
| S4 | 2.164 | 2.07 | | | | |
| S5 | −13.956 | 2.33 | 1.64 | 23.5 | 12.565 | L3 |
| S6 | −5.460 | 3.50 | | | | |
| ST | | 0.54 | | | | Aperture |
| S8 | 5.127 | 1.47 | 1.59 | 67.7 | 4.626 | L4 |
| S9 | −5.341 | 0.70 | | | | |
| S10 | 29.870 | 0.80 | 1.64 | 23.5 | −3.779 | L5 |
| S11 | 2.229 | 0.17 | | | | |
| S12 | 3.227 | 2.14 | 1.53 | 56 | 3.665 | L6 |
| S13 | −3.708 | 2.5 | | | | |
| S14 | 0.00E+00 | 0.4 | 1.516 | 64 | | Infrared filter |
| S15 | 0.00E+00 | 0.10 | | | | |
| S16 | 0.00E+00 | 0.50 | 1.516 | 64 | | Protective glass |
| Im | 0 | 0 | | | | |

It can be seen from Table 1 that, in the current embodiment, the focal length F of the optical imaging lens 100 is 1.46 mm, and the Fno of the optical imaging lens 100 is 2.4, and the HFOV of the optical imaging lens 100 is 210 degrees, and the TTL of the optical imaging lens 100 is 24.3 mm, wherein f1=−4.468 mm; f2=−8.39 mm; f3=12.565 mm; f4=4.626 mm; f5=−3.779 mm; f6=3.665 mm; the focal length f123 of the first lens assembly C1 formed by the first lens L1, the second lens L2, and the third lens L3=−5.567 mm; the focal length f456 of the second lens assembly C2 formed by the fourth lens L4, the fifth lens L5, and the sixth lens L6=4.773 mm.

Additionally, based on the above detailed parameters, detailed values of the aforementioned conditional formula in the first embodiment are as follows: F/TTL=0.06; F/f123=−0.262; F/f1=−0.326; F/f2=−0.174; F/f3=0.116; f1/f2=0.532; f2/f3=−0.667; F/f456=0.305; F/f4=0.315; F/f5=−0.386; F/f6=0.398; f6/f5=−0.969; f4/f5=−1.224; f456/f123=−0.857.

With the aforementioned design, the first lens assembly C1 and the second lens assembly C2 satisfy the aforementioned conditions (1) to (6) of the optical imaging lens 100.

Moreover, an aspheric surface contour shape Z of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, and the image-side surface S13 of the sixth lens L6 of the optical imaging lens 100 according to the first embodiment could be obtained by following formula:

$$Z = \frac{ch^2}{1 + \sqrt{1 - (1+k)c^2 h^2}} + A_4 h^4 + A_6 h^6 + A_8 h^8 + A_{10} h^{10} + A_{12} h^{12} + A_{14} h^{14} + A_{16} h^{16}$$

wherein Z is aspheric surface contour shape; c is reciprocal of radius of curvature; h is half the off-axis height of the surface; k is conic constant; A4, A6, A8, A10, A12, A14, and A16 respectively represents different order coefficient of h.

The conic constant k of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, and the image-side surface S13 of the sixth lens L6 of the optical imaging lens 100 according to the first embodiment and the different order coefficient of A4, A6, A8, A10, A12, A14, and A16 are listed in following Table 2:

TABLE 2

| Surface | k | A4 | A6 | A8 | A10 | A12 | A14 | A16 |
|---|---|---|---|---|---|---|---|---|
| S3 | 1.6967E+01 | 1.3215E−02 | −4.1772E−03 | 5.0964E−04 | −3.2685E−05 | 1.0990E−06 | −1.5327E−08 | 0 |
| S4 | −8.6180E−01 | 2.2838E−02 | −6.5923E−03 | −1.6780E−03 | 9.0416E−04 | −1.3778E−04 | 7.7412E−06 | 0 |
| S5 | 1.5089E+00 | −2.9804E−03 | −1.4921E−03 | 2.7789E−04 | −1.5097E−05 | 0 | 0 | 0 |
| S6 | 9.4873E−02 | −1.8610E−03 | 5.6357E−05 | 2.3677E−05 | −3.0834E−06 | 0 | 0 | 0 |
| S10 | −5.2694E+01 | −3.4777E−02 | 5.8285E−03 | −2.7855E−03 | 1.1560E−03 | −2.4825E−04 | 1.9991E−05 | 0 |
| S11 | −2.7395E−01 | −2.2714E−02 | −1.1071E−02 | 4.9890E−03 | −1.1088E−03 | 1.1076E−04 | −4.8653E−06 | 0 |
| S12 | 1.0798E−01 | 1.9440E−02 | −2.0170E−02 | 7.1119E−03 | −1.4448E−03 | 1.6045E−04 | −8.3158E−06 | 0 |
| S13 | −1.2445E+00 | 4.3046E−03 | −9.0553E−04 | −1.4316E−04 | 1.8485E−04 | −3.2159E−05 | 1.6306E−06 | 0 |

Figure 1B:
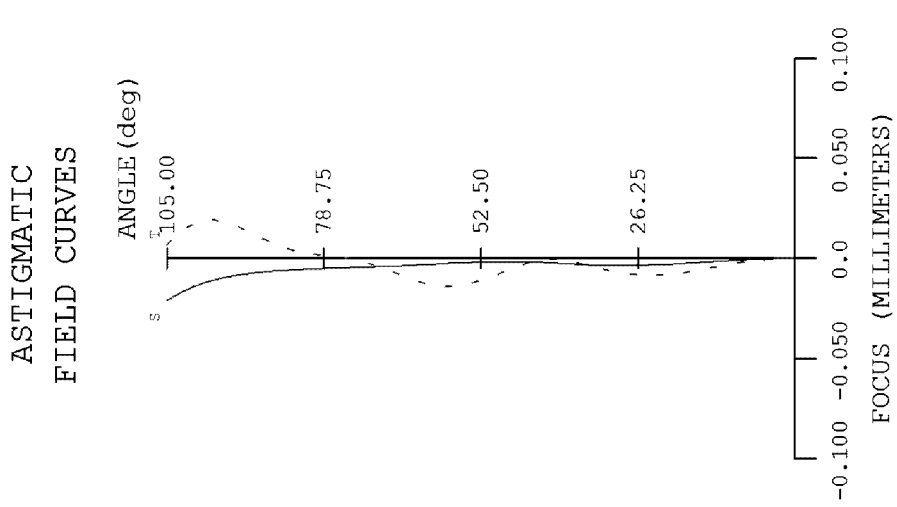
FIG. 1B is a diagram showing the astigmatic field curvature of the optical imaging lens according to the first embodiment of the present invention.
Figure 1C:
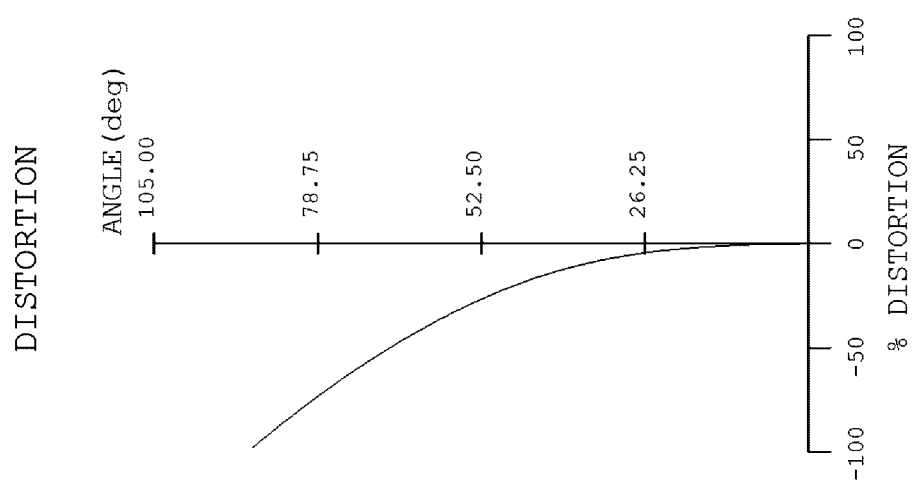
FIG. 1C is a diagram showing the distortion of the optical imaging lens according to the first embodiment of the present invention.
Figure 1D:
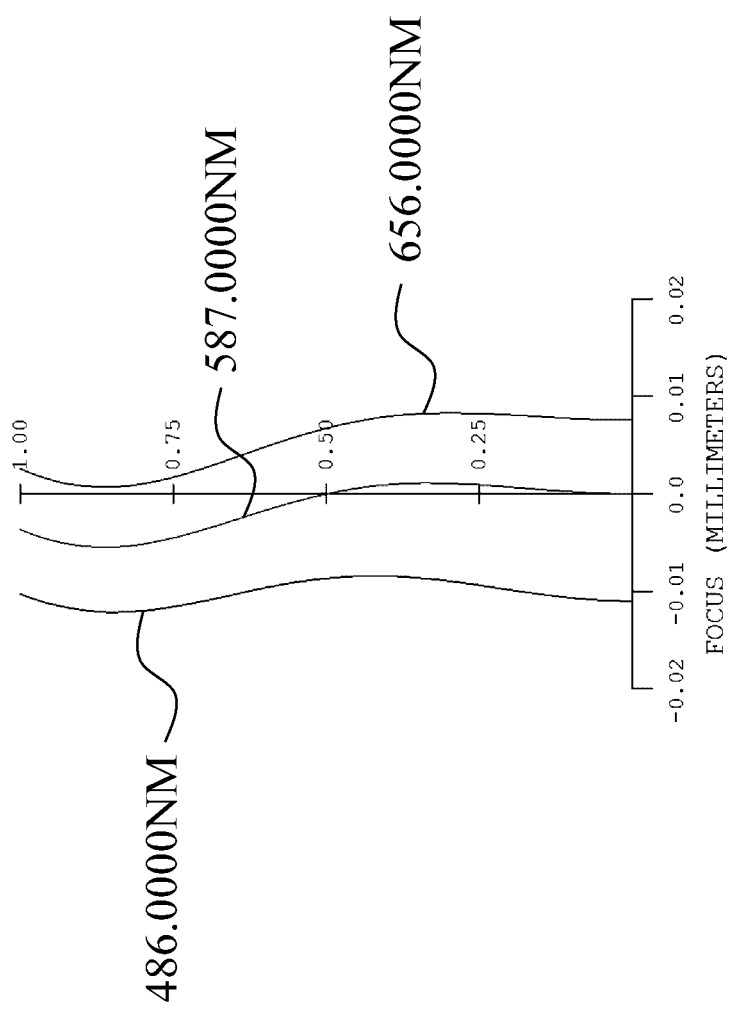
FIG. 1D is a diagram showing the longitudinal spherical aberration of the optical imaging lens according to the first embodiment of the present invention.

Taking optical simulation data to verify the imaging quality of the optical imaging lens 100, wherein FIG. 1B a diagram showing the astigmatic field curves according to the first embodiment; FIG. 1C is a diagram showing the distortion according to the first embodiment; FIG. 1D is a diagram showing the longitudinal spherical aberration according to the first embodiment. In FIG. 1B, a curve S is data of a sagittal direction, and a curve T is data of a tangential direction. The graphics shown in FIG. 1C and FIG. 1D are within a standard range. In this way, the optical imaging lens 100 of the first embodiment could effectively enhance image quality and lower a distortion thereof.

Figure 2A:
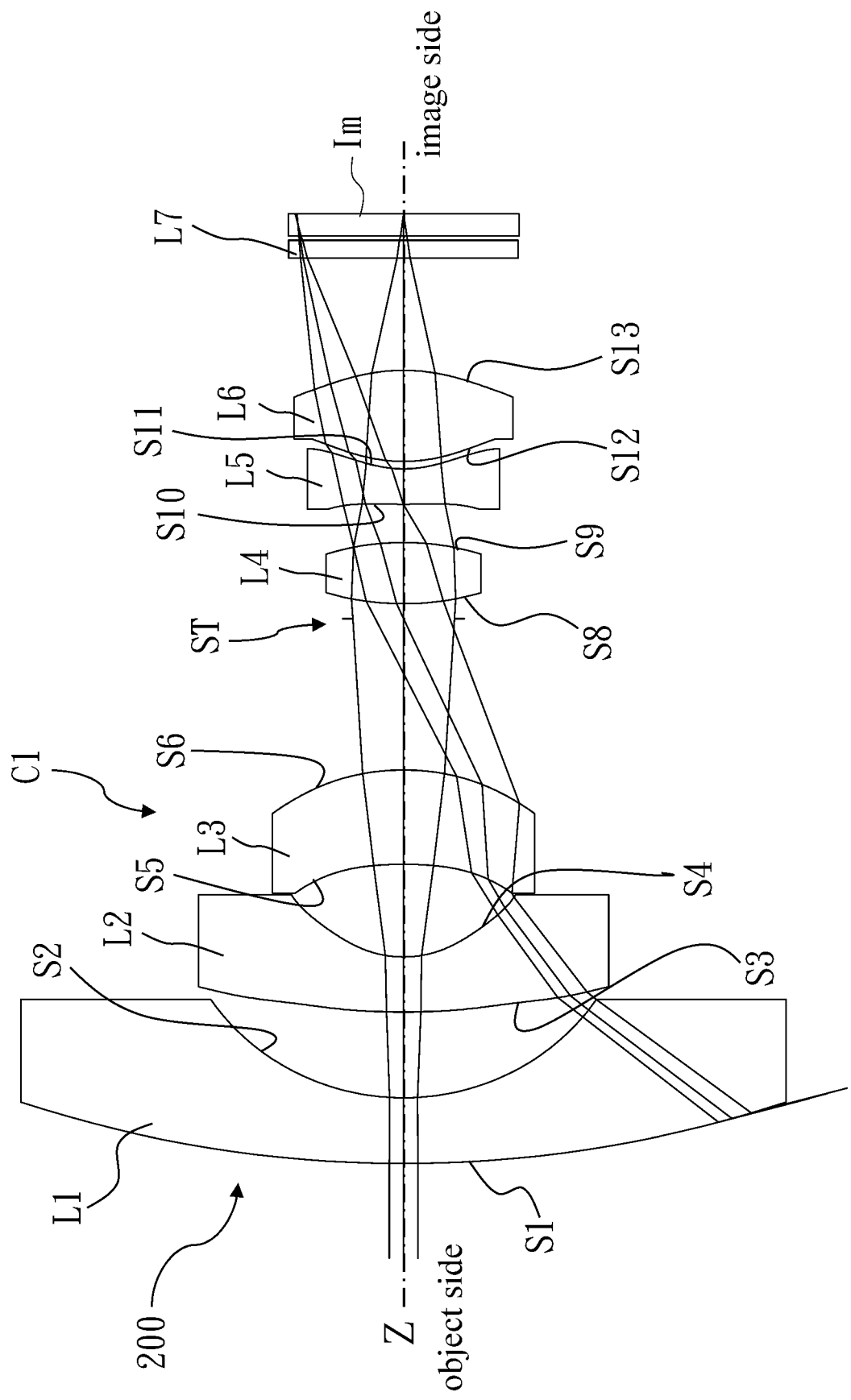
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first lens assembly C1, an aperture ST, and a second lens assembly C2.

The first lens assembly C1 has negative refractive power and includes a first lens L1, a second lens L2, and a third lens L3 in order along the optical axis Z from the object side to the image side. In the second embodiment, the second lens L2 is in contact with the third lens L3.

The first lens L is a negative meniscus with negative refractive power, wherein an object-side surface S1 of the first lens L1 is a convex surface, and an image-side surface S2 of the first lens L1 is a concave surface that is arc-shaped. In the current embodiment, a part of a surface of the first lens L1 toward the image side is recessed to form the image-side surface S2, and the optical axis Z passes through both the object-side surface S1 and the image-side surface S2. The object-side surface S1 of the first lens L1, the image-side surface S2 of the first lens L1, or both of the object-side surface S1 and the image-side surface S2 of the first lens L1 are spherical surfaces. In the current embodiment, both of the object-side surface S1 and the image-side surface S2 of the first lens L1 are spherical surfaces.

The second lens L2 is a negative meniscus with negative refractive power, an object-side surface S3 of the second lens L2 is a convex surface that is slightly convex toward the object side and has no inflection point, and an image-side surface S4 of the second lens L2 is a concave surface that is arc-shaped. In the second embodiment, the object-side surface S3 of the second lens L2 is not in contact with the image-side surface S2 of the first lens L1. In the current embodiment, a part of a surface of the second lens L2 toward the image side is recessed to form the image-side surface S4, and the optical axis Z passes through both the object-side surface S3 and the image-side surface S4. The object-side surface S3 of the second lens L2, the image-side surface S4 of the second lens L2, or both of the object-side surface S3 and the image-side surface S4 of the second lens L2 are aspheric surfaces. In the current embodiment, both of the object-side surface S3 and the image-side surface S4 of the second lens L2 are aspheric surfaces.

The third lens L3 is a positive meniscus with positive refractive power, wherein an object-side surface S5 of the third lens L3 is a concave surface, and an image-side surface S6 of the third lens L3 is a convex surface. The object-side surface S5 of the third lens L3 is in contact with the image-side surface S4 of the second lens L2 to fix a distance between the second lens L2 and the third lens L3. The object-side surface S5 of the third lens L3, the image-side surface S6 of the third lens L3, or both of the object-side surface S5 and the image-side surface S6 of the third lens L3 are aspheric surfaces. In the current embodiment, both of the object-side surface S5 and the image-side surface S6 of the third lens L3 are aspheric surfaces.

The second lens assembly C2 has positive refractive power and includes a fourth lens L4, a fifth lens L5, and a sixth lens L6 in order along the optical axis Z from the object side to the image side.

The fourth lens L4 is a biconvex lens with positive refractive power (i.e., an object-side surface S8 of the fourth lens L4 and an image-side surface S9 thereof are convex surfaces), wherein the object-side surface S8 of the fourth lens L4, the image-side surface S9 of the fourth lens L4, or both of the object-side surface S8 and the image-side surface S9 of the fourth lens L4 are spherical surfaces. In the current embodiment, both of the object-side surface S8 and the image-side surface S9 of the fourth lens L4 are spherical surfaces.

The fifth lens L5 is a biconcave lens with negative refractive power (i.e., an object-side surface S10 of the fifth lens L5 and an image-side surface S1l thereof are concave surfaces), wherein the object-side surface S10 of the fifth lens L5, the image-side surface S11 of the fifth lens L5, or both of the object-side surface S10 and the image-side surface S11 of the fifth lens L5 are aspheric surfaces. In the current embodiment, both of the object-side surface S10 and the image-side surface S1l of the fifth lens L5 are aspheric surfaces.

The sixth lens L6 is a biconvex lens with positive refractive power (i.e., an object-side surface S12 of the sixth lens L6 and an image-side surface S13 thereof are convex surfaces), wherein the object-side surface S12 of the sixth lens L6 has two inflection points. The object-side surface S12 of the sixth lens L6, the image-side surface S13 of the sixth lens L6, or both of the object-side surface S12 and the image-side surface S13 of the sixth lens L6 are aspheric surfaces. In the current embodiment, both of the object-side surface S12 and the image-side surface S13 of the sixth lens L6 are aspheric surfaces.

Additionally, the optical imaging lens 200 further includes an infrared filter L7 disposed at a side of the image-side surface S13 of the sixth lens L6 and located between the sixth lens L6 and an image plane Im of the optical imaging lens 200.

In order to keep the optical imaging lens 200 in good optical performance and high imaging quality, the optical imaging lens 200 further satisfies:
(1) $0.05 < F/TTL < 0.075$;
(2) $-0.29 < F/f123 < -0.25$; $-0.45 < F/f1 < -0.1$; $-0.4 < F/f2 < -0.1$; $0.05 < F/f3 < 0.15$;
(3) $0.45 < f1/f2 < 2.5$; $-0.7 < f2/f3 < -0.25$;
(4) $0.27 < F/f456 < 0.35$; $0.25 < F/f4 < 0.35$; $-0.4 < F/f5 < -0.3$; $0.45 < F/f6 < 0.35$;
(5) $-1.5 < f6/f5 < -0.8$; $-1.5 < f4/f5 < -0.8$;
(6) $-0.9 < f456/f123 < -0.8$;

wherein TTL is a total length of the optical imaging lens 200 (i.e., a distance on the optical axis Z from the object-side surface of the first lens to the image plane); F is a focal length of the optical imaging lens 200; f1 is a focal length of the first lens L1; f2 is a focal length of the second lens L2; f3 is a focal length of the third lens L3; f4 is a focal length of the fourth lens L4; f5 is a focal length of the fifth lens L5; f6 is a focal length of the sixth lens L6; f123 is a focal length of the first lens assembly C1; f456 is a focal length of the second lens assembly C2.

Parameters of the optical imaging lens 200 of the second embodiment of the present invention are listed in the following Table 2, including the focal length (F) (also called an effective focal length (EFL)) of the optical imaging lens 200, a F-number (Fno), the maximal field of view (HFOV), TTL is a total length of the optical imaging lens 200; a radius of curvature (R) of each lens, a distance (D) between each surface and the next surface on the optical axis Z, a refractive index (Nd) of each lens, an Abbe number (Vd) of each lens, the focal length of each lens, and the focal length of the first lens assembly C1 and the focal length of the second lens assembly C2, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 3

F = 1.5 mm; Fno = 2.45; HFOV = 212 deg; TTL = 21.57 mm; 1/2 Image height = 2.3mm

| Surface | R (mm) | D (mm) | Nd | Vd | Focal length | Note |
|---|---|---|---|---|---|---|
| S1 | 25.301 | 1.48 | 1.73 | 54.1 | −8.789 | L1 |
| S2 | 5.000 | 1.94 | | | | |
| S3 | 22.102 | 1.24 | 1.54 | 55.9 | −4.653 | L2 |
| S4 | 2.235 | 2.20 | | | | |
| S5 | −7.358 | 2.13 | 1.66 | 20.4 | 15.535 | L3 |
| S6 | −4.802 | 3.43 | | | | |
| ST | | 0.34 | | | | Aperture |
| S8 | 5.712 | 1.39 | 1.59 | 67.7 | 4.868 | L4 |
| S9 | −5.379 | 0.87 | | | | |
| S10 | 17.087 | 0.80 | 1.66 | 20.4 | −4.247 | L5 |
| S11 | 2.385 | 0.17 | | | | |
| S12 | 3.555 | 2.06 | 1.54 | 55.9 | 3.704 | L6 |
| S13 | −3.737 | 2.5 | | | | |
| S14 | 0.00E+00 | 0.4 | 1.516 | 64 | | Infrared filter |
| S15 | 0.00E+00 | 0.10 | | | | |
| S16 | 0.00E+00 | 0.50 | 1.516 | 64 | | Protective glass |
| Im | 0 | 0 | | | | |

It can be seen from Table 3 that, in the second embodiment, the focal length (F) of the optical imaging lens 200 is 1.5 mm; the Fno of the optical imaging lens 200 is 2.45; the HFOV of the optical imaging lens 200 is 212 degrees; TTL of the optical imaging lens 200 is 21.57 mm; f1=−8.789 mm; f2=−4.653 mm; f3=15.535 mm; f4=4.868 mm; f5=−4.247 mm; f6=3.704 mm; the focal length f123 of the first lens assembly C1 formed by the first lens L1, the second lens L2, and the third lens L3=−5.384 mm; the focal length f456 of the second lens assembly C2 formed by the fourth lens L4, the fifth lens L5, and the sixth lens L6=4.689 mm.

Additionally, based on the above detailed parameters, detailed values of the aforementioned conditional formula in the second embodiment are as follows: F/TTL=0.695; F/f123=−0.278; F/f1=−0.17; F/f2=−0.322; F/f3=0.096; f1/f2=1.88; f2/f3=−0.299; F/f456=0.319; F/f4=0.308; F/f5=−0.353; F/f6=0.404; f6/f5=−0.872; f4/f5=−1.146; f456/f123=−0.87.

With the aforementioned design, the first lens assembly C1 and the second lens assembly C2 satisfy the aforementioned conditions (1) to (6) of the optical imaging lens 200.

Moreover, an aspheric surface contour shape Z of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, and the image-side surface S13 of the sixth lens L6 of the optical imaging lens 200 according to the second embodiment could be obtained by following formula:

$$Z = \frac{ch^2}{1 + \sqrt{1 - (1+k)c^2 h^2}} + A_4 h^4 + A_6 h^6 + A_8 h^8 + A_{10} h^{10} + A_{12} h^{12} + A_{14} h^{14} + A_{16} h^{16}$$

wherein Z is aspheric surface contour shape; c is reciprocal of radius of curvature; h is half the off-axis height of the surface; k is conic constant; A4, A6, A8, A10, A12, A14, and A16 respectively represents different order coefficient of h.

The conic constant k of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, and the image-side surface S13 of the sixth lens L6 of the optical imaging lens 200 according to the second embodiment and the different order coefficient of A4, A6, A8, A10, A12, A14, and A16 are listed in following Table 4:

TABLE 4

| Surface | k | A4 | A6 | A8 | A10 | A12 | A14 | A16 |
|---|---|---|---|---|---|---|---|---|
| S3 | 2.3289E+01 | 1.0431E−02 | −2.8450E−03 | 3.3052E−04 | −2.0541E−05 | 6.7989E−07 | −9.6097E−09 | 0 |
| S4 | −8.1525E−01 | 1.4252E−02 | −3.0831E−03 | −1.9041E−03 | 8.1155E−04 | −1.1980E−04 | 6.9074E−06 | 0 |
| S5 | 5.0096E+00 | −6.6553E−03 | −1.4014E−03 | 3.6629E−04 | −1.9375E−05 | 0 | 0 | 0 |
| S6 | 1.5481E−01 | −2.6656E−03 | 1.9991E−04 | 1.5488E−05 | −1.2769E−06 | 0 | 0 | 0 |
| S10 | 9.2871E+00 | −3.2864E−02 | 4.0061E−03 | −2.3661E−03 | 1.2833E−03 | −3.4313E−04 | 3.7097E−05 | 0 |
| S11 | −2.6090E−01 | −2.0686E−02 | −1.3833E−02 | 6.5354E−03 | −1.5696E−03 | 1.8839E−04 | −9.5839E−06 | 0 |
| S12 | 1.9120E−01 | 1.9440E−02 | −2.0170E−02 | 7.1119E−03 | −1.4448E−03 | 1.6045E−04 | −8.3158E−06 | 0 |
| S13 | −1.3436E+00 | 4.7169E−03 | −7.5456E−04 | −1.5775E−04 | 1.7470E−04 | −3.2159E−05 | 1.6306E−06 | 0 |

Figure 2B:
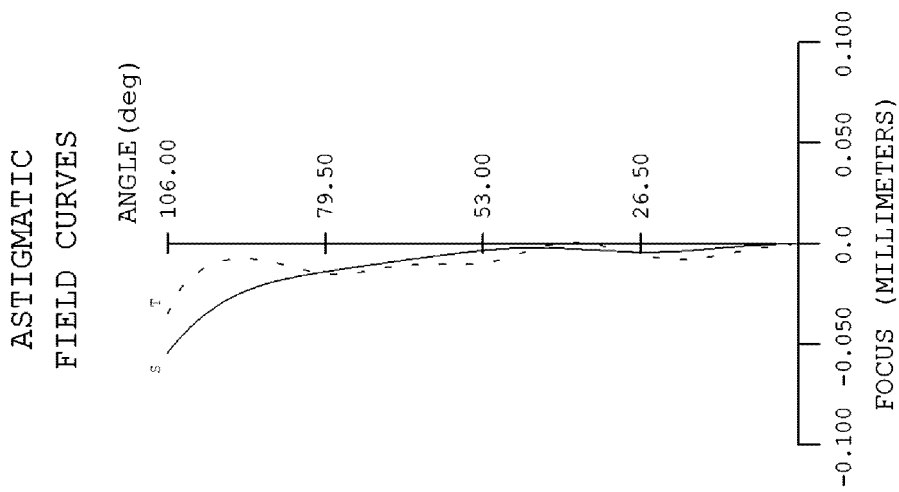
FIG. 2B is a diagram showing the astigmatic field curvature of the optical imaging lens according to the second embodiment of the present invention.
Figure 2C:
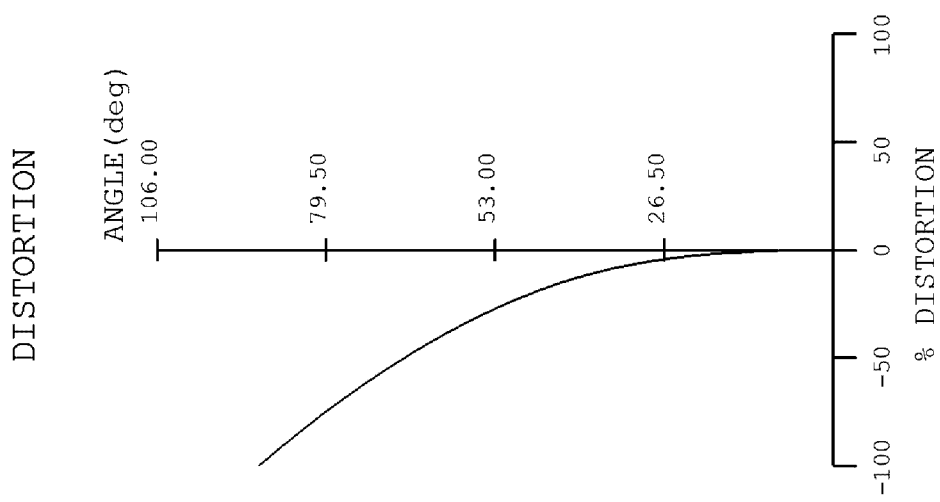
FIG. 2C is a diagram showing the distortion of the optical imaging lens according to the second embodiment of the present invention.
Figure 2D:
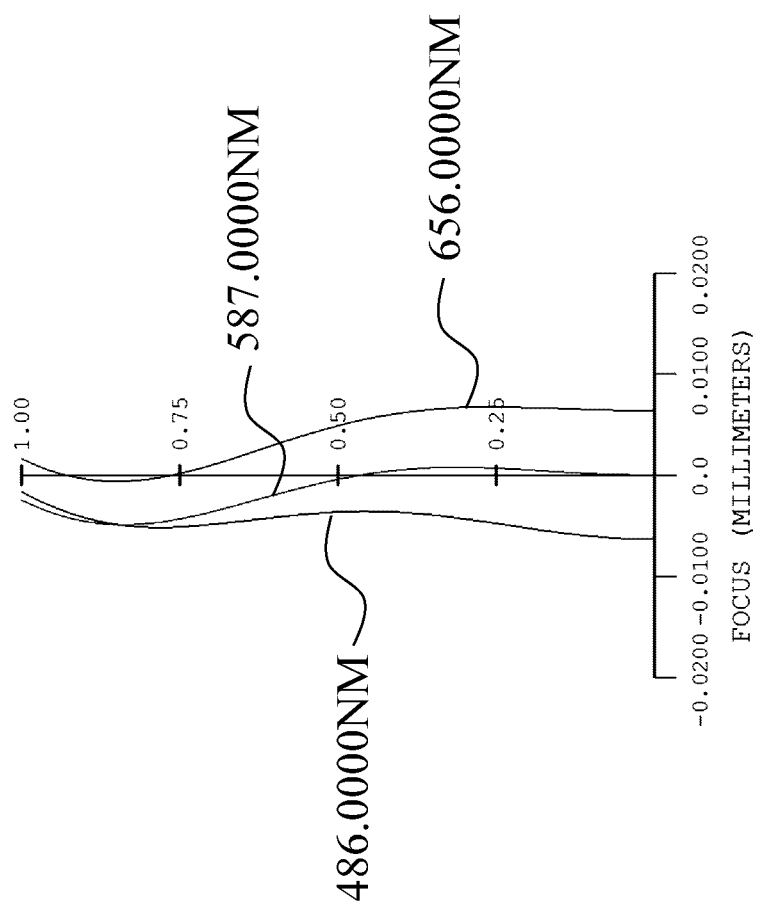
FIG. 2D is a diagram showing the longitudinal spherical aberration of the optical imaging lens according to the second embodiment of the present invention.

Taking optical simulation data to verify the imaging quality of the optical imaging lens 200, wherein FIG. 2B a diagram showing the astigmatic field curves according to the second embodiment; FIG. 2C is a diagram showing the distortion according to the second embodiment; FIG. 2D is a diagram showing the longitudinal spherical aberration according to the second embodiment. In FIG. 2B, a curve S is data of a sagittal direction, and a curve T is data of a tangential direction. The graphics shown in FIG. 2C and FIG. 2D are within a standard range. In this way, the optical imaging lens 200 of the second embodiment could effectively enhance image quality and lower a distortion thereof.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, comprising:
    a first lens assembly having negative refractive power, wherein the first lens assembly comprises a first lens, a second lens, and a third lens in order from the object side to the image side along the optical axis; at least two of the first lens, the second lens, and the third lens are in contact with each other; the first lens has negative refractive power; an object-side surface of the first lens is a convex surface, and an image-side surface of the first lens is a concave surface; the object-side surface of the first lens and/or the image-side surface of the first lens are/is a spherical surface; the second lens has negative refractive power; an object-side surface of the second lens is a convex surface, and an image-side surface of the second lens is a concave surface; the object-side surface of the second lens and/or the image-side surface of the second lens are/is an aspheric surface; the third lens has positive refractive power; an object-side surface of the third lens is a concave surface, and an image-side surface of the third lens is a convex surface; the object-side surface of the third lens and/or the image-side surface of the third lens are/is an aspheric surface;
    an aperture;
    a second lens assembly having positive refractive power, wherein the second lens assembly comprises a fourth lens, a fifth lens, and a sixth lens in order from the object side to the image side along the optical axis; the fourth lens is a biconvex lens with positive refractive power; an object-side surface of the fourth lens and/or an image-side surface of the fourth lens are/is a spherical surface; the fifth lens is a biconcave lens with negative refractive power; an object-side surface of the fifth lens and/or an image-side surface of the fifth lens are/is an aspheric surface; the sixth lens is a biconvex lens with positive refractive power; an object-side surface of the sixth lens and/or an image-side surface of the sixth lens are/is an aspheric surface.

2. The optical imaging lens as claimed in claim 1, wherein both of the object-side surface of the first lens and the image-side surface of the first lens are spherical surfaces.

3. The optical imaging lens as claimed in claim 1, wherein both of the object-side surface of the second lens and the image-side surface of the second lens are aspheric surfaces.

4. The optical imaging lens as claimed in claim 1, wherein both of the object-side surface of the third lens and the image-side surface of the third lens are aspheric surfaces.

5. The optical imaging lens as claimed in claim 1, wherein both of the object-side surface of the fourth lens and the image-side surface of the fourth lens are spherical surfaces.

6. The optical imaging lens as claimed in claim 1, wherein both of the object-side surface of the fifth lens and the image-side surface of the fifth lens are aspheric surfaces.

7. The optical imaging lens as claimed in claim 1, wherein both of the object-side surface of the sixth lens and the image-side surface of the sixth lens are aspheric surfaces.

8. The optical imaging lens as claimed in claim 1, wherein the optical imaging lens satisfies: $0.05<F/TTL<0.075$, wherein F is a focal length of the optical imaging lens; TTL is a total length of the optical imaging lens.

9. The optical imaging lens as claimed in claim 1, wherein the optical imaging lens satisfies: $-0.29<F/f123<-0.25$, wherein F is a focal length of the optical imaging lens; f123 is a focal length of the first lens assembly.

10. The optical imaging lens as claimed in claim 1, wherein the optical imaging lens satisfies: $0.27<F/f456<0.35$, wherein F is a focal length of the optical imaging lens; f456 is a focal length of the second lens assembly.

11. The optical imaging lens as claimed in claim 1, wherein the optical imaging lens satisfies: $-0.9<f456/f123<-0.8$, wherein f456 is a focal length of the second lens assembly; f123 is a focal length of the first lens assembly.

12. The optical imaging lens as claimed in claim 1, wherein the optical imaging lens satisfies: $-0.45<F/f1<-0.1$, wherein F is a focal length of the optical imaging lens; f1 is a focal length of the first lens.

13. The optical imaging lens as claimed in claim 1, wherein the optical imaging lens satisfies: $-0.4<F/f2<-0.1$, wherein F is a focal length of the optical imaging lens; f2 is a focal length of the second lens.

14. The optical imaging lens as claimed in claim 1, wherein the optical imaging lens satisfies: $0.05<F/f3<0.15$, wherein F is a focal length of the optical imaging lens; f3 is a focal length of the third lens.

15. The optical imaging lens as claimed in claim 1, wherein the optical imaging lens satisfies: $0.45<f1/f2<2.5$, wherein f1 is a focal length of the first lens; f2 is a focal length of the second lens.

16. The optical imaging lens as claimed in claim 1, wherein the optical imaging lens satisfies: $-0.7<f2/f3<-0.25$, wherein f2 is a focal length of the second lens; f3 is a focal length of the third lens.

17. The optical imaging lens as claimed in claim 1, wherein the optical imaging lens satisfies: $0.25<F/f4<0.35$, wherein F is a focal length of the optical imaging lens; f4 is a focal length of the fourth lens.

18. The optical imaging lens as claimed in claim 1, wherein the optical imaging lens satisfies: $-0.4<F/f5<-0.3$, wherein F is a focal length of the optical imaging lens; f5 is a focal length of the fifth lens.

19. The optical imaging lens as claimed in claim 1, wherein the optical imaging lens satisfies: $0.45<F/f6<0.35$, wherein F is a focal length of the optical imaging lens; f6 is a focal length of the sixth lens.

20. The optical imaging lens as claimed in claim 1, wherein the optical imaging lens satisfies: $-1.5<f6/f5<-0.8$, wherein f6 is a focal length of the sixth lens; f5 is a focal length of the fifth lens.

21. The optical imaging lens as claimed in claim 1, wherein the optical imaging lens satisfies: $-1.5<f4/f5<-0.8$, wherein f4 is a focal length of the fourth lens; f5 is a focal length of the fifth lens.

* * * * *